(No Model.) 4 Sheets—Sheet 4.
T. E. DANIELS.
CHAIN MORTISING MACHINE.
No. 313,924. Patented Mar. 17, 1885.
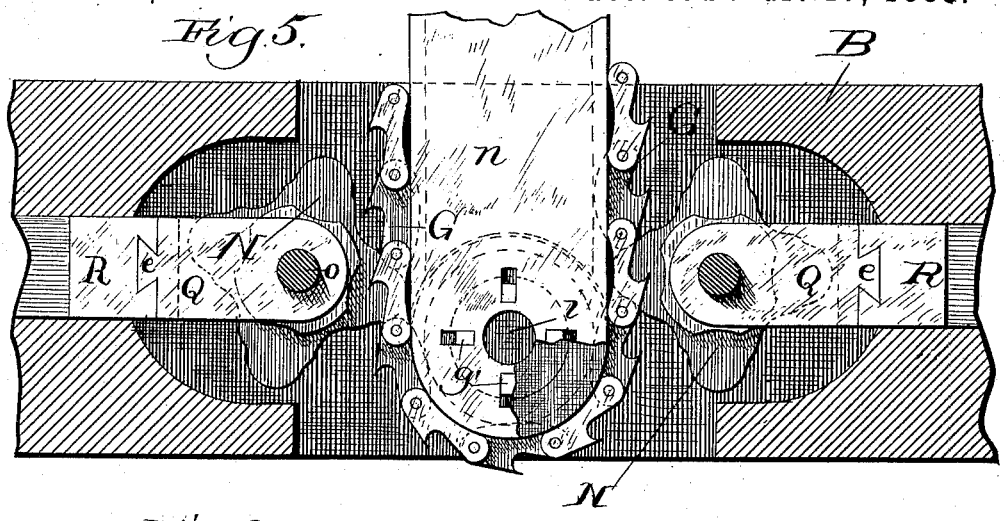
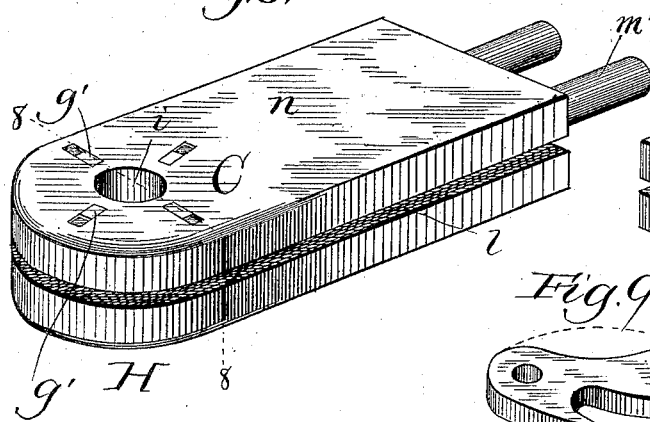
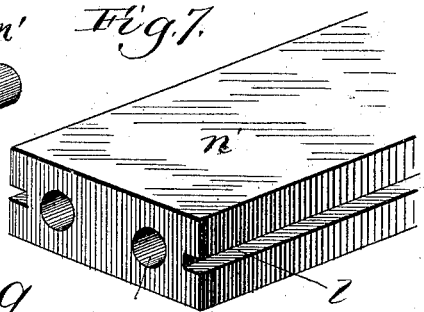
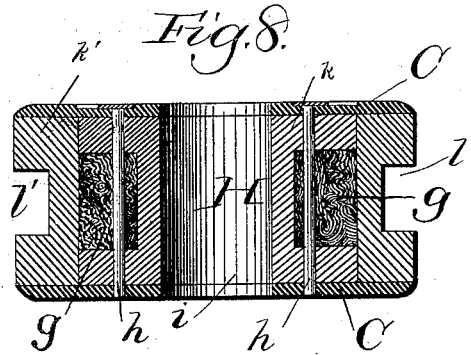
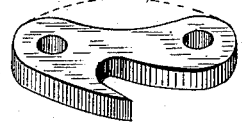
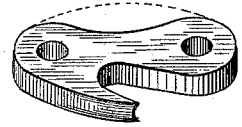
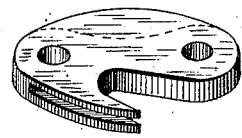
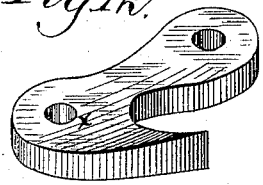
Witnesses:
Chas. E. Gaylord,
Douglas Dyrenforth.
Inventor:
Taylor E. Daniels,
by Dyrenforth & Dyrenforth,
Att'ys

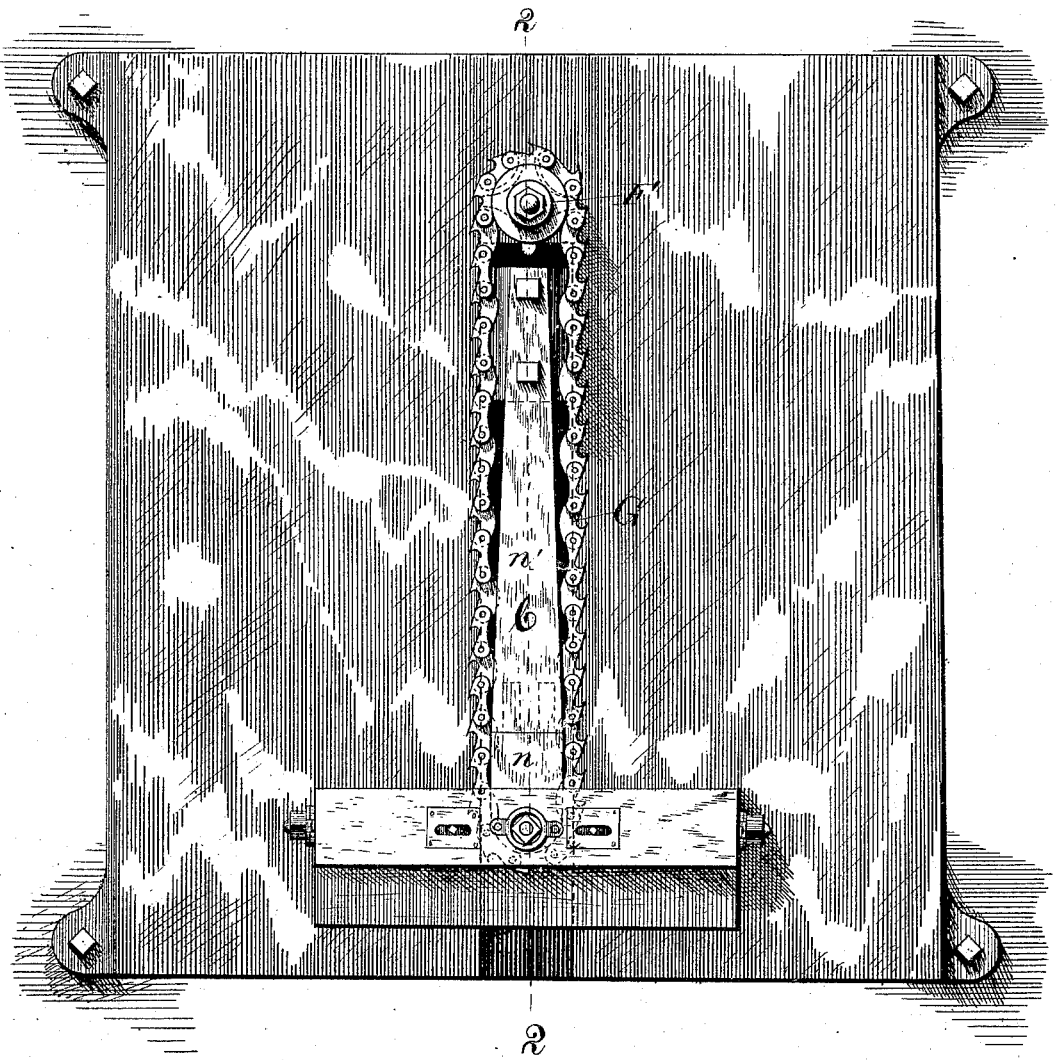

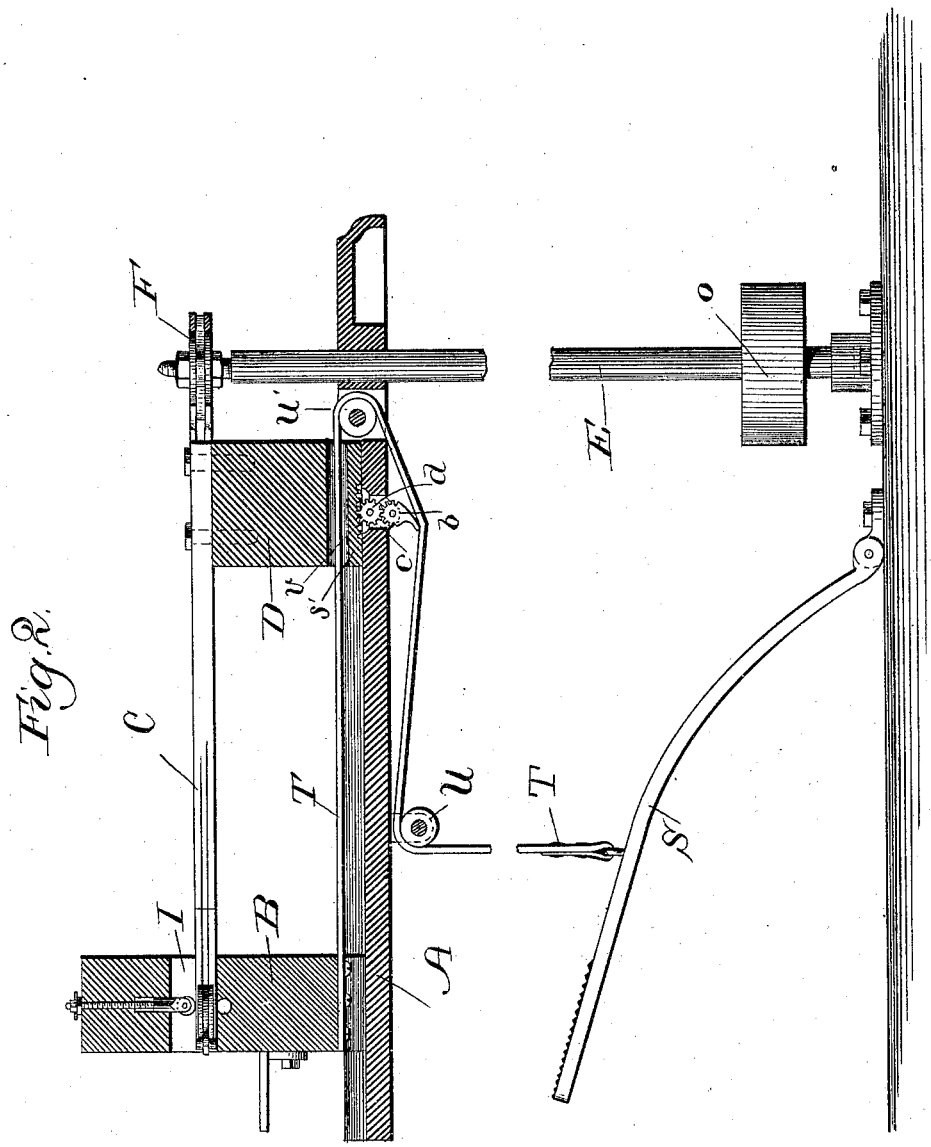

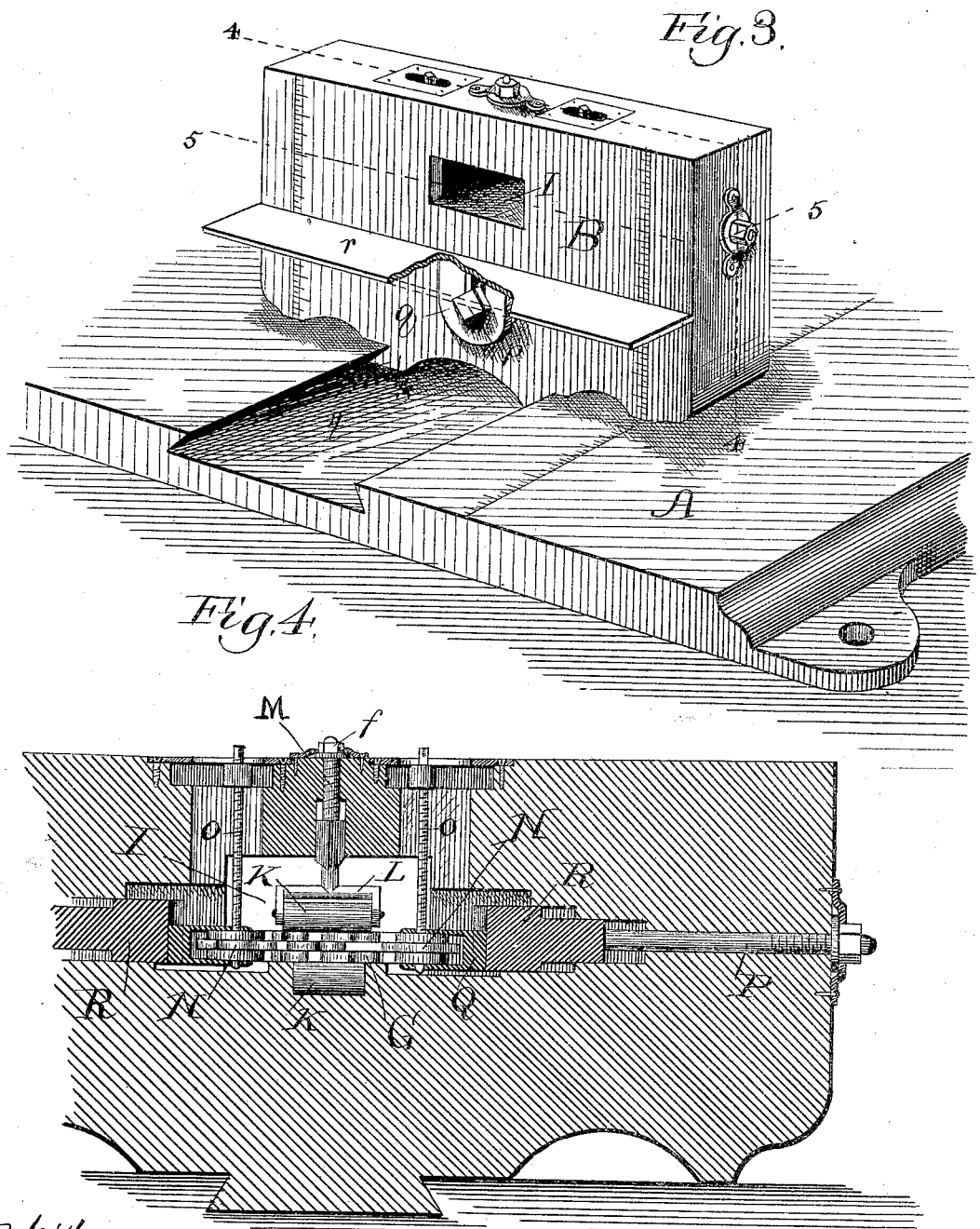

UNITED STATES PATENT OFFICE.

TAYLOR E. DANIELS, OF CHICAGO, ILLINOIS.

CHAIN MORTISING-MACHINE.

SPECIFICATION forming part of Letters Patent No. 313,924, dated March 17, 1885.

Application filed January 28, 1884. (No model.)

*To all whom it may concern:*

Be it known that I, TAYLOR E. DANIELS, a citizen of the United States, residing at Chicago, in the county of Cook and State of Illinois, have invented certain new and useful Improvements in Chain Mortising-Machines; and I hereby declare the following to be a full, clear, and exact description of the same.

Various patents have been granted, both to myself and others, for different forms of mortising-machines, in which an endless-chain cutter is employed. In most of these machines the chain has operated in a vertical direction. I have found by experience that great advantages are secured by having the chain operate in a horizontal position, since the machinery may thereby be greatly simplified and more easily regulated and controlled. Moreover, in all former endless-chain mortising-machines with which I am familiar, the bar which carries the chain is held firmly only at the end opposite that at which the cutting is effected. The result of this is that the bar is liable to deviate slightly from a straight line when the chain comes into contact with the object to be mortised, especially if the wood within the area of the mortise is of unequal hardness—as, for example, owing to the presence of a knot. By the features constituting my present invention, I overcome the above difficulties, and also improve the machine in other respects, as will hereinafter appear.

In the drawings, Figure 1 is a plan view of my machine; Fig. 2, a vertical section of the same, on the line 2 2 of Fig. 1; Fig. 3, a perspective view of the bed and sliding support and guide for the object to be mortised; Fig. 4, a vertical section of the support and guide, taken on the line 4 4 of Fig. 3; Fig. 5, a horizontal section of the same, taken on the line 5 5 of Fig. 3; Fig. 6, a perspective view of the forward portion of the chain-carrying bar; Fig. 7, a similar view of the rear portion of the same; Fig. 8, a transverse section of the forward end of the chain-carrying bar, taken on the line 8 8 of Fig. 6; and Figs. 9, 10, 11, and 12 perspective views showing different forms of link for the chain.

A is the bed of the machine, supported upon a suitable frame, to which it is secured by screws, and provided with a dovetailed groove, *t*.

B is the sliding carrier of the object to be mortised and guide for the chain-holding bar C. It is provided at its base with a dovetailed tenon, *s*, fitting within the groove *t*, and upon its front side with a shelf, *r*, adjustable to different heights upon it by means of the slotted plate *q* and set-screw *p*.

D is a block provided at its base with a dovetailed tenon, *s'*, fitting the groove *t*, whereby this block slides upon the bed in the same manner as the guide and support B. To the top of this block the rear end of the bar C is firmly secured, and the said bar extends forward therefrom horizontally in the direction of the guide B, as shown.

Behind the block D is a vertical rotary shaft, E, provided with a pulley, *o*, to permit it to be turned by a belt, and carrying at its upper end, in line with the bar C, a driver, F, for the mortise-cutting chain G, the construction of which driver may correspond with those heretofore in use for a like purpose. The chain is composed of links comprising alternately a single and a double tooth, and the teeth may be of any of many well-known forms, which may be varied to suit different conditions, depending both upon the character of the mortise and the quality of the wood.

Figs. 9, 10, 11, and 12 show four forms of tooth, which may or may not all be employed in the same chain. In very hard wood, or wood in which knots frequently occur, the resistance presented to the chain is liable to be considerable and irregular. In such cases especially there is an advantage in having the cutting effected gradually—that is, by causing each fresh cut to be effected not by one tooth alone, but to be begun by one tooth and completed by one or more succeeding teeth. Thus, the first tooth of a series may have two cutting points or edges, as represented in Figs. 10 and 11, and the next succeeding tooth or pair of teeth a single cutting-edge, as represented in Fig. 9 of the drawings. A good arrangement of the teeth is to form the cutting portion of each single tooth as represented in Fig. 10 or Fig. 11, and the cutting portion of each of the following double teeth as represented in Fig. 9.

It is frequently desirable to form some or all of the teeth in the manner represented in Fig. 12—that is to say, having the outer face, X, concaved or hollow-ground—as thereby friction is reduced to the minimum without impairing the effectiveness of the tooth or materially reducing its strength. The bar C is formed in two parts, n and n', the part n' being provided in its end with sockets m and the part n with dowels m' to enter the sockets. It is obvious, however, that other means may be employed for the purpose of fitting the two parts together—as, for example, a single dowel and mortise. The part n' is made tapering, as represented in Fig. 1, whereby the chain comes into contact with its edges only at or about its junction with the part n. This greatly reduces the friction between the chain and bar, and for this reason the part n' may be made of cast-iron, the part n only being made of steel, thereby greatly reducing the cost of construction. That portion of the bar with which the chain comes into contact is provided with a groove, l.

Set into the outer end of the part n is a pulley, H, the said end being recessed to receive it. This pulley comprises two concentric rings, K and K'. The interior of the ring K opens through the part n of the bar, as shown at i, thus giving ventilation to the interior to keep it cool. The ring K is secured rigidly in place by means of bolts or rivets h, passing entirely through it and through the upper and lower faces of the bar, and it is provided with an annular recess or groove, g, to receive packing for lubricating purposes. The oil is admitted to the packing by means of openings g', extending from the outside of the bar to the recess. The ring K' fits loosely around the ring K, and is provided with a groove, l', for the chain. In line with the end of the bar is an opening, I, through the guide B. Thus, when the guide B is slid backward, the end of the bar, together with the chain cutter, is carried through the opening I and cuts a mortise upon the object mounted upon the shelf r. As explained in the beginning of this specification, one of the leading objects of my invention is to prevent deviation of the bar from a direct line while the chain is performing its work. I do this by providing mechanism within the opening I which is capable of adjustment to the exact dimensions of the chain and bar, thus holding them firmly against any pressure which would tend to produce a deviation. The adjustability of this mechanism is desirable, owing to the fact that chains and bars of various dimensions have to be substituted one for another in the the same machine for different classes of work. This mechanism comprises two rollers, K, of a length not exceeding the width of the bar C, mounted in bearings L—one in the upper and one in the lower part of the opening I—whereby the bar passes between them, and made relatively adjustable by means of screws M and nuts f, as shown, and also two spur-wheels, N, having spurs to enter between the links and teeth of the chain, said spur-wheels being made capable of both a lateral and a vertical adjustment by means of the lateral screw P and vertical screw O. The bearing Q for each spur-wheel N is dovetailed, as shown at e, into the block R, which is moved by means of the screws P, and may thus slide up and down in that block when acted upon by the screw O. The lateral adjustment of the spur-wheels N, through the medium of the devices named, permits it to be adjusted for bars and chains of any desired size, laterally considered, while the vertical adjustment through the medium of the set-screw O permits the projections upon the spur-wheels to be fitted to the spaces between the links of different-sized chains.

Any one of various well-known devices may be employed for sliding the guide or support B toward the chain cutter. The one shown in the drawings will operate satisfactorily, and consists of a treadle, S, connected to the support B by means of a strap, T, passing over pulleys U and U' and through an opening in the block D. This mechanism carries it only in one direction, namely, toward the cutter; but, if desired, it may be returned by means of an analogous treadle and strap operating to move it in a contrary direction.

As represented in the drawings, the return is designed to be effected by hand.

In order to save wear by friction it is a matter of considerable importance that the chain be slackened upon the bar when it is not cutting and tightened only when the act of cutting is about to be performed. This is effected through the sliding movement given to the block D, and it is rendered automatic by causing the same effort which moves the support B in one direction to move the block D a limited distance in the contrary direction.

Various mechanisms, well known to mechanics, may be employed for this purpose. Where a strap and treadle are used, such as represented in Fig. 2, and above described, the auxiliary device there represented will be found suitable and convenient. This device comprises a rack, V, upon the bottom of the block D, a pinion, d, mounted in bearings within an opening, c, through the bed A, and a rock-pawl, b, supported upon a bearing upon the under side of the bed A, and having its end lying against the strap T. In this way pressure exerted upon the treadle S by tightening the strap throws the end of the pawl upward, thus turning the pinion in a direction to move the block D, through the medium of the rack V, toward the guide B; and since the bar C is rigidly fixed to the block D this movement serves to tighten the chain. When the pressure is relaxed, the block D yields under the strain of the chain, thus resuming its former position of its own accord and causing the chain to slacken.

In order to gage the mortise with accuracy I provide both the front of the guide B and the bed of the machine with a scale, as shown in Fig. 3.

What I claim as new, and desire to secure by Letters Patent, is—

1. In a chain mortising-machine, the combination, with the supporting-frame, endless-chain cutter mounted upon a bar, mechanism for driving the chain cutter, and support for the object to be mortised, of guides bearing against the sides and edges of the chain-carrying bar, whereby the chain cutter is prevented from deviating from a straight line, substantially as described.

2. In a chain mortising-machine, the combination, with the chain cutter, and mechanism for driving and bar for supporting the same, of the sliding body B, supported upon the machine and having on its side opposite the end of the chain cutter a shelf for the object to be mortised, and having through it, in line with the chain cutter, an opening, I, provided internally with rotary guide mechanism to bear against the chain cutter and bar without impeding the action of the chain cutter, substantially as described.

3. In a chain mortising-machine, the combination, with the chain cutter, and mechanism for driving and bar for supporting the same, of the device for guiding the said bar and chain and preventing their deviation from a direct line, comprising the body B, supported upon the machine, and having an opening, I, through it for the passage of the bar and chain, and made movable forward and back with relation to the bar and chain, and provided internally with rollers K and mechanism for adjusting the said rollers to and from each other, and also with spur-wheels N and mechanism for adjusting the said spur-wheels to and from each other, substantially as described.

4. In a chain mortising-machine, the combination, with the guide or support B, provided with the aperture I, to receive the end of the chain-supporting bar and chain thereon, of the spur-wheels N, upon bearings within the aperture I, and mechanism for adjusting them vertically to correspond with the adjustment of the chain upon the chain-carrying bar, and mechanism for adjusting them laterally to permit engagement with the links of different-sized chains, substantially as described.

5. In a chain mortising-machine, the combination, with the endless-chain cutter and mechanism for driving the same, of the bar for supporting the chain cutter, said bar being provided with a pulley at its forward end, and being made tapering, as shown, and broadest toward its forward end, whereby the chain cutter is in contact with it for only a portion of its length, thus reducing friction, as set forth.

6. The bar C, for supporting the chain cutter, made tapering, as described, whereby it is broadest toward its forward end, and formed in two parts, $n$ and $n'$, fitting together, as and for the purpose set forth.

7. In combination with the chain-supporting bar of a chain mortising-machine, provided with a recess in its outer end and with openings $i$ leading thereto, the pulley H, set into the said recess and comprising the ring K, rigidly secured in place, with its interior in line with the openings $i$ of the bar, and provided with an annular recess, $g$, for packing, and with openings $g'$, extended through the bar to admit oil thereto, and the loose ring $k'$, surrounding the ring $k$, and provided with the groove $l'$, substantially as described.

TAYLOR E. DANIELS.

In presence of—
 ALBERT G. MACK,
 DOUGLAS DYRENFORTH.